W. DICKERSON & W. H. STRAIN.
Plow.
No. 211,002. Patented Dec. 17, 1878.
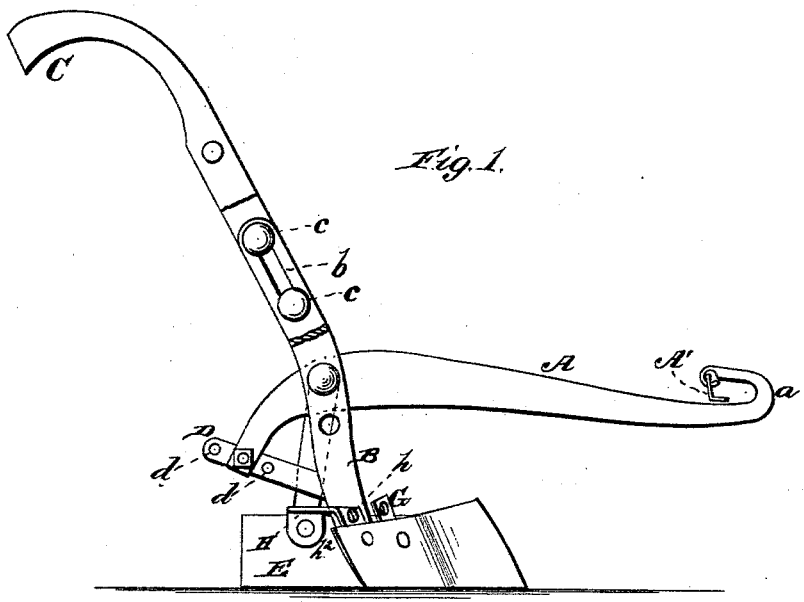
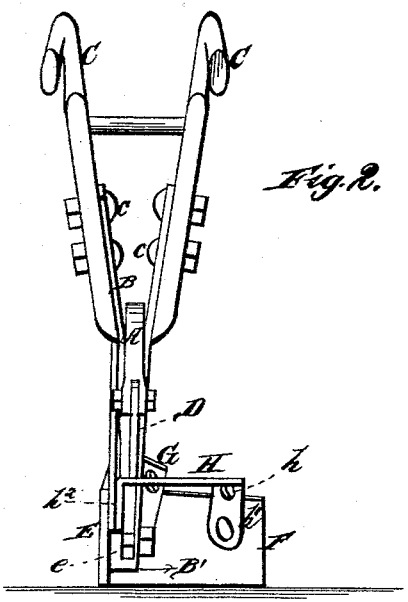
WITNESSES
Robert Everett
H. Clay Smith
INVENTORS.
Woodson Dickerson.
Wm. H. Strain.
By Gilmore, Smith & Co.
ATTORNEYS.

UNITED STATES PATENT OFFICE.

WOODSON DICKERSON AND WILLIAM H. STRAIN, OF SUMMERVILLE, GEORGIA, ASSIGNORS OF ONE-FOURTH THEIR RIGHT TO JOHN TAYLOR, OF SAME PLACE.

IMPROVEMENT IN PLOWS.

Specification forming part of Letters Patent No. 211,002, dated December 17, 1878; application filed October 19, 1878.

*To all whom it may concern:*

Be it known that we, WOODSON DICKERSON and WILLIAM H. STRAIN, of Summerville, in the county of Chattooga and State of Georgia, have invented a new and valuable Improvement in Plows; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of our plow, and Fig. 2 is a rear view of the same.

Our invention relates to a plow for agricultural purposes; and the novelty consists in the construction and arrangement of parts, as will be more fully hereinafter set forth, and pointed out in the claim.

Referring to the drawings, A represents the beam, having a hook, $a$, on its forward end to receive the whiffletree-staple, said hook being controlled against uncoupling by a drop-lever, A'. B represents the stock, having perforations to receive necessary bolts and taps, a solid foot, B', and bifurcated upward-extending extremities, which embrace the beam and beam-brace, and to which the handles C are secured by bolts $c$, which operate in slots $b$ in the stock B, allowing the handles to be susceptible of vertical adjustment at will. D represents the beam-brace, having perforations $d$, to allow adjustability of the plow relatively to the beam, and it is secured to the stock by being embraced between the bifurcated extremities of the stock, or embracing the same, as shown, by bolts and nuts, or other similar means.

The foregoing constitutes the body of our device, and it is adapted to receive a scraper, plowshare, or double plow, as will be seen by referring to the figures.

E represents the land-side, secured to the stock at $e$; and F, the scraper or mold-board. An upwardly-extending perforated plate, G, is secured to the portion F, as also is a curved brace, H, perforated at $h$, having two downwardly-projecting portions, $h^1$ $h^2$, the former of which is secured to the scraper F, and the latter to the land-side E. The perforations in these parts G and H are adapted to receive and secure a mold-board, as is obvious.

The beam is vertically adjustable, and the hook and lever $a$ A' avoid the necessity of clevis and bolt.

Any suitable foot, plow, scraper, cultivator, or the like may be attached, and they may be moved up and down at will.

The stock may be made in two parts, and a scraper attached to each.

What we claim as new, and desire to secure by Letters Patent, is—

In a plow, the combination of the perforated bifurcated stock B, having the solid point B' and slotted extensions $b$ $c$ $c$, secured directly to the handles, with the beam A and the pivoted perforated beam-brace D, substantially as set forth.

In testimony that we claim the above we have hereunto subscribed our names in the presence of two witnesses.

WOODSON DICKERSON.
WILLIAM H. STRAIN.

Witnesses:
GEORGE J. MOZERS,
GEORGE M. C. BRANNER.